(12) United States Patent
Hu

(10) Patent No.: US 11,546,260 B1
(45) Date of Patent: Jan. 3, 2023

(54) NETWORK DEVICE AND MEDIA ACCESS CONTROL ADDRESS LEARNING METHOD THEREFOR

(71) Applicant: Cortina Access, Inc., San Jose, CA (US)

(72) Inventor: Xiaori Hu, San Jose, CA (US)

(73) Assignee: REALTEK SINGAPORE PTE LTD., Singapore (SG)

( * ) Notice: Subject to any disclaimer, the term of this patent is extended or adjusted under 35 U.S.C. 154(b) by 27 days.

(21) Appl. No.: 17/350,266

(22) Filed: Jun. 17, 2021

(51) Int. Cl.
| | |
|---|---|
| *H04L 45/7453* | (2022.01) |
| *H04L 9/40* | (2022.01) |
| *H04L 45/00* | (2022.01) |
| *H04L 49/25* | (2022.01) |
| *H04L 61/103* | (2022.01) |

(52) U.S. Cl.
CPC .......... *H04L 45/7453* (2013.01); *H04L 45/54* (2013.01); *H04L 49/251* (2013.01); *H04L 61/103* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 5,343,471 A | * | 8/1994 | Cassagnol | H04L 12/4625 370/401 |
| 10,764,214 B1 | * | 9/2020 | Plenderleith | H04L 45/02 |
| 10,862,801 B1 | * | 12/2020 | Akash | H04L 45/021 |
| 2007/0242682 A1 | * | 10/2007 | Kyusojin | H03M 13/09 370/401 |
| 2010/0333190 A1 | * | 12/2010 | Niinomi | H04L 49/3063 726/13 |

OTHER PUBLICATIONS

Author Unknown, Use of Cut-Through for Industrial and Automotive Markets, pp. 1-22, Mar. 2017.*
J. Specht, On Standardization of Cut-Through Forwarding (CTF), pp. 1-25, Jan. 24, 2020.*

* cited by examiner

*Primary Examiner* — Christopher M Crutchfield
(74) *Attorney, Agent, or Firm* — McClure, Qualey & Rodack, LLP

(57) ABSTRACT

A Media Access Control address (MAC) learning method includes: parsing out packet header and packet verification parameter of a packet from an input/output port; generating a port identifier corresponding to the input/output port; starting first-stage procedure for the packet header; and starting second-stage procedure for the packet verification parameter. The first-stage procedure includes: performing, according to a MAC forwarding table and the port identifier, learning processing for source MAC address of the packet header to generate learning result; generating status parameter according to the learning result; and associating and storing the status parameter, the port identifier, and a hash address corresponding to the source MAC address into a memory. The second-stage procedure includes: obtaining the status parameter and the hash address from the memory according to the port identifier; and updating the MAC forwarding table according to the packet verification parameter, the obtained status parameter, and the obtained hash address.

20 Claims, 10 Drawing Sheets

| Serial Number | Hash address | MAC address | Port identifier parameter | MAC quantity | Elapsed time parameter | Update flag | Move flag | Establish flag | Static | Valid |
|---|---|---|---|---|---|---|---|---|---|---|
| 1 | 0x00 /0x0 | 09-54-11-2D-C5-22 | port A | 2 | 30s | 0 | 0 | 0 | 0 | 1 |
| 2 | 0x00 /0x1 | 48-5B-39-F0-8E-95 | port A | 2 | 100s | 0 | 0 | 0 | 0 | 1 |
| 3 | 0x00 /0x2 | 33-4A-91-E0-8C-9A | port B | 3 | 200s | 0 | 0 | 0 | 0 | 1 |
| 4 | 0x04 /0x0 | 32-48-15-6D-A7-C8 | port B | 3 | 250s | 0 | 0 | 0 | 0 | 1 |
| 5 | 0x04 /0x1 | 15-87-5D-6E-7A-D8 | port C | 2 | 38s | 1 | 1 | 0 | 0 | 1 |
| 6 | 0x04 /0x2 | 22-33-44-55-66-77 | port C | 2 | 45s | 1 | 0 | 0 | 0 | 1 |
| 7 | 0x04 /0x3 | 7A-8D-9C-1E-5C-7E | port D | 1 | 66s | 0 | 1 | 0 | 0 | 1 |
| 8 | 0x08 /0x1 | 7D-8E-9A-1F-5A-7C | port B | 3 | 66s | 0 | 0 | 1 | 0 | 1 |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 2 | 200s | 0 | 0 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 2 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | N/A | N/A | N/A | N/A | N/A | N/A | N/A | N/A | N/A |

1411

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 3 | 200s | 0 | 0 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 3 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | 22-11-33-44-55-66 | port A | 3 | N/A | 0 | 0 | 1 | 0 | 1 |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 2 | 200s | 1 | 0 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 2 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | N/A | N/A | N/A | N/A | N/A | N/A | N/A | N/A |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 2 | 200s | 0 | 1 | 0 | 0 | 1 |
| 0x00 /0x1 | BB-CC-DD-EE-FF-AA | port B | 3 | 200s | 0 | 0 | 0 | 0 | 1 |
| 0x00 /0x2 | CC-AA-BB-DD-EE-FF | port A | 2 | 200s | 0 | 0 | 0 | 0 | 1 |
| 0x00 /0x3 | 11-22-33-44-55-66 | port B | 3 | 200s | 0 | 0 | 0 | 0 | 1 |
| 0x04 /0x0 | N/A | N/A | N/A | N/A | N/A | N/A | N/A | N/A | N/A |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 2 | 200s | 0 | 1 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 2 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | N/A | N/A | N/A | N/A | N/A | N/A | N/A | N/A | N/A |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 3 | 200s | 0 | 0 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 3 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | 22-11-33-44-55-66 | port A | 3 | 0s | 0 | 0 | 0 | 0 | 1 |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port B | 3 | 0s | 0 | 0 | 0 | 0 | 1 |
| 0x00 /0x1 | BB-CC-DD-EE-FF-AA | port B | 3 | 200s | 0 | 0 | 0 | 0 | 1 |
| 0x00 /0x2 | CC-AA-BB-DD-EE-FF | port A | 1 | 200s | 0 | 0 | 0 | 0 | 1 |
| 0x00 /0x3 | 11-22-33-44-55-66 | port B | 3 | 200s | 0 | 0 | 0 | 0 | 1 |
| 0x04 /0x0 | N/A | N/A | N/A | N/A | N/A | N/A | N/A | N/A | N/A |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | N/A | N/A | N/A | N/A | N/A | N/A | N/A | N/A | N/A |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 1 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | N/A | N/A | N/A | N/A | N/A | N/A | N/A | N/A | N/A |

| Hash address | MAC address | Port identifier parameter | MAC quantity | Elapsed time parameter | Update flag | Move flag | Establish flag | Static | Valid |
|---|---|---|---|---|---|---|---|---|---|
| 0x00 /0x0 | AA-BB-CC-DD-EE-FF | port A | 2 | 0s | 0 | 0 | 0 | 0 | 1 |
| 0x00 /0x1 | BB-CC-DD-EE-FF-AA | port B | 2 | 200s | 0 | 0 | 0 | 0 | 1 |
| 0x00 /0x2 | CC-AA-BB-DD-EE-FF | port A | 2 | 200s | 0 | 0 | 0 | 0 | 1 |
| 0x00 /0x3 | 11-22-33-44-55-66 | port B | 2 | 200s | 0 | 0 | 0 | 0 | 1 |
| 0x04 /0x0 | N/A | N/A | N/A | N/A | N/A | N/A | N/A | N/A | N/A |

FIG. 17

NETWORK DEVICE AND MEDIA ACCESS CONTROL ADDRESS LEARNING METHOD THEREFOR

BACKGROUND

Technical Field

The present disclosure relates to a network technology, and in particular, to a network device and a method for Media Access Control (MAC) address learning.

Related Art

A network switch may use cut-through switching during transmission of packets from an electronic device. Specifically, instead of forwarding a packet and establishing and maintaining a MAC address forwarding table (for example, store and forward switching) after receiving and storing the complete packet, the network switch performs an action to forward the packet through a destination MAC address and establishes and maintains the MAC address forwarding table through a source MAC address after receiving the source MAC address and the destination MAC address of the packet. Compared with the store and forward switching, a packet forwarding speed of the network switch is faster during the cut-through switching.

However, the cut-through switching may cause an erroneous source MAC address to be learned into the MAC address forwarding table, resulting in occupation of an effective storage capacity of the MAC address forwarding table, and some actions (for example, station move) being triggered by mistake. For example, the network switch learns the source MAC address into the MAC address forwarding table without determining whether the integrity verification of the packet passed is pass or not. Therefore, if the source MAC address is damaged (for example, the source MAC address is not completely sent from the electronic device to the network switch), the MAC address forwarding table may be caused to learn the erroneous source MAC address, thereby causing the station move to be triggered by the erroneous source MAC address (that is, the station move is triggered by mistake).

SUMMARY

In view of the above, the present disclosure provides a network switching device and a MAC address learning method. According to some embodiments, the network switching device may filter out an erroneous source MAC address from a MAC address forwarding table in the case of cut-through switching.

According to some embodiments, the network switching device includes a forwarding engine and a two-stage learning engine. The forwarding engine is configured to receive a packet from an input/output port, parse out a packet header and a packet verification parameter of the packet, and generate a port identifier corresponding to the input/output port, where the forwarding engine forwards the packet to another input/output port according to a MAC forwarding table, and the packet header has a source MAC address. The two-stage learning engine includes a memory and a two-stage learning circuit. The memory stores the MAC forwarding table. The two-stage learning circuit is configured to start a first-stage procedure when obtaining the source MAC address and the port identifier; and start a second-stage procedure when obtaining the packet verification parameter and the port identifier. The first-stage procedure includes: performing, according to the MAC forwarding table and the port identifier, a learning process for the source MAC address to generate a learning result; generating a status parameter according to the learning result; and associating and storing the status parameter, the port identifier, and a hash address corresponding to the source MAC address into the memory. The second-stage procedure includes: obtaining the status parameter and the hash address from the memory according to the port identifier; and updating the MAC forwarding table according to the packet verification parameter, the obtained status parameter, and the obtained hash address.

According to some embodiments, a MAC address learning method is adapted to a network switching device. The MAC address learning method includes: receiving a packet from an input/output port; generating a port identifier corresponding to the input/output port; starting a first-stage procedure when a packet header of the packet is parsed out, where the packet header has a source MAC address; starting a second-stage procedure when a packet verification parameter of the packet is parsed out; and forwarding the packet to another input/output port according to a MAC forwarding table of a memory. The first-stage procedure includes: performing, according to the MAC forwarding table and the port identifier, a learning process for the source MAC address to generate a learning result; generating a status parameter according to the learning result; and associating and storing the status parameter, the port identifier, and a hash address corresponding to the source MAC address into the memory. The second-stage procedure includes: obtaining the status parameter and the hash address from the memory according to the port identifier; and updating the MAC forwarding table according to the packet verification parameter, the obtained status parameter, and the obtained hash address.

Based on the above, according to some embodiments, the network switching device filters out an erroneous source MAC address from the MAC address forwarding table in the case of cut-through switching, so that in the case of fast forwarding of packets, the MAC address forwarding table can still store only correct source MAC addresses. According to some embodiments, a storage capacity required during processing of the packet by the network switching device is reduced, and a processing speed during processing of the packet by the network switching device is increased since the network switching device may perform a learning process for the source MAC address when receiving the source MAC address from the packet (in other words, there is no need to perform the learning process after storing the entire packet), and confirm the above learning processing after receiving the entire packet. For example, when the network switching device obtains an instruction about discarding the packet during the learning of the source MAC address, the packet may be discarded, thereby increasing the speed of processing the packet. In this way, the network switching device can complete the learning of the source MAC address at a line rate (that is, a physical layer gross bit rate).

BRIEF DESCRIPTION OF THE DRAWINGS

FIG. 9 is a schematic diagram of the MAC forwarding table after the first-stage procedure is executed when a first condition is met according to some embodiments of the present disclosure.

FIG. 10 is a schematic diagram of the MAC forwarding table after the first-stage procedure is executed when a second condition is met according to some embodiments of the present disclosure.

FIG. 11 is a schematic diagram of the MAC forwarding table after the first-stage procedure is executed when a third condition is met according to an embodiment of the present disclosure.

FIG. 12 is a schematic diagram of the MAC forwarding table after the first-stage procedure is executed when the third condition is met according to another embodiment of the present disclosure.

FIG. 14 is a schematic diagram of the MAC forwarding table after the second-stage procedure is executed according to an establishment parameter when verification passed according to some embodiments of the present disclosure.

FIG. 15 is a schematic diagram of the MAC forwarding table after the second-stage procedure is executed according to a movement parameter when the verification passed according to some embodiments of the present disclosure.

FIG. 16 is a schematic diagram of the MAC forwarding table after the second-stage procedure is executed according to a movement limit exceeding parameter when the verification passed according to some embodiments of the present disclosure.

FIG. 17 is a schematic diagram of the MAC forwarding table after the second-stage procedure is executed according to an update parameter when the verification passed according to some embodiments of the present disclosure.

DETAILED DESCRIPTION

Figure 1:
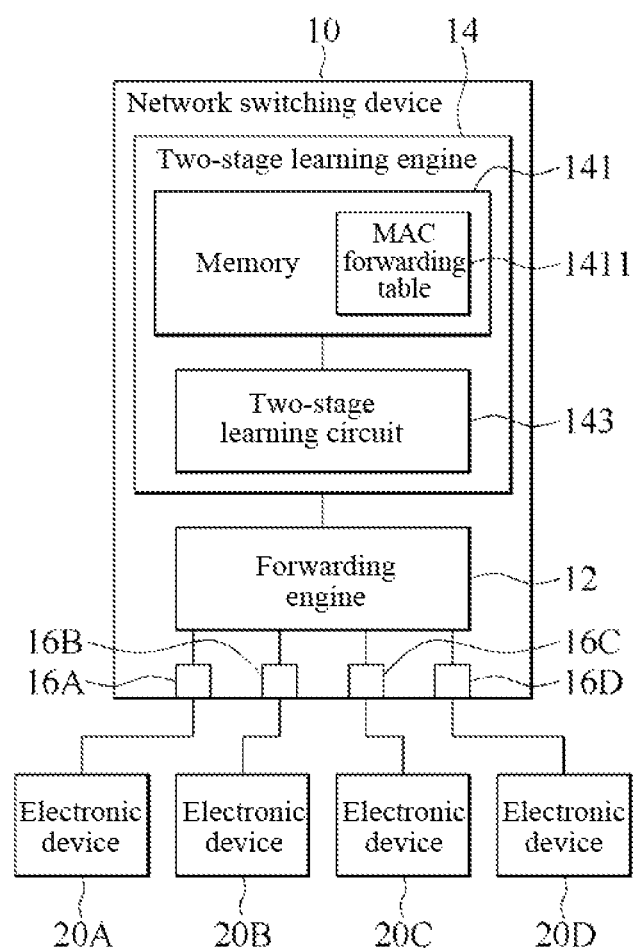
FIG. 1 is a schematic diagram of application of a network switching device according to some embodiments of the present disclosure.

Referring to FIG. 1, FIG. 1 is a schematic diagram of application of a network switching device 10 according to some embodiments of the present disclosure. The network switching device 10 includes a forwarding engine 12, a two-stage learning engine 14, and a plurality of input/output ports 16A-16D. The forwarding engine 12 is coupled to the two-stage learning engine 14 and the input/output ports 16A-16D. The input/output ports 16A-16D are for being coupled to a plurality of electronic devices 20A-20D. Although FIG. 1 only shows four input/output ports and four electronic devices, the present disclosure is not limited thereto. The two-stage learning engine 14 includes a memory 141 and a two-stage learning circuit 143. The two-stage learning circuit 143 is coupled to the memory 141. The memory 141 stores a MAC address forwarding table (referred to as a MAC forwarding table 1411 below). The MAC forwarding table 1411 records a correspondence between MAC addresses (referred to as recorded MAC addresses below) of the electronic devices 20A-20D and the input/output ports 16A-16D (for example, port identifier parameters are used to represent the input/output ports 16A-16D). The memory 141 may be a volatile memory, a non-volatile memory, or a combination thereof. In some examples, the volatile memory is a random access memory, or the like, and the non-volatile memory is a read-only memory, or the like. The two-stage learning circuit 143 may be an operational circuit such as a microcontroller, an embedded controller, an application-specific integrated circuit, a system-on-chip, or the like.

The network switching device 10 is configured to forward data (such as packets) of the electronic devices 20A-20D through the input/output ports 16A-16D and the forwarding engine 12. In other words, the electronic devices 20A-20D transmit packets through the network switching device 10. The network switching device 10 may forward the packets of the electronic devices 20A-20D through the MAC address in a data link layer.

The forwarding engine 12 is configured to receive a packet from one of the input/output ports 16A-16D, parse out a packet header and a packet verification parameter of the packet, generate a port identifier (Port ID) corresponding to the one of the input/output ports 16A-16D, where the packet is received from, and output the packet header, the packet verification parameter, and the port identifier to the two-stage learning engine 14. The packet header has a source MAC address. In some embodiments, the packet header further has a destination MAC address.

The two-stage learning engine 14 establishes and maintains the MAC forwarding table 1411 according to the source MAC address, the port identifier, and the packet verification parameter. For example, the two-stage learning engine 14 checks whether the MAC forwarding table 1411 has recorded the source MAC address of the packet or not. If the source MAC address has not been recorded in the MAC forwarding table 1411, the two-stage learning engine 14 records the source MAC address of the packet (that is, the MAC addresses of the electronic devices 20A-20D) and the port identifier (specifically, the port identifier is used as the port identifier parameter and recorded in the MAC forwarding table 1411). If the source MAC address has been recorded in the MAC forwarding table 1411, the two-stage learning engine 14 adjusts some parameters in the MAC forwarding table 1411. Through this learning method, the correspondence between the MAC addresses of the electronic devices 20A-20D and the input/output ports 16A-16D can be established and maintained.

The forwarding engine 12 forwards the packet from one of the input/output port 16A-16D to another one of the input/output ports 16A-16D according to the MAC forwarding table 1411. For example, the forwarding engine 12 compares the destination MAC address of the packet with the MAC forwarding table 1411 (that is, forwarding query) to learn the port identifier parameter corresponding to the destination MAC address (that is, learn the input/output ports 16A-16D corresponding to the destination MAC address), and forwards the packet from the corresponding I/O ports 16A-16D to the electronic devices 20A-20D corresponding to the destination MAC address.

Figure 2:
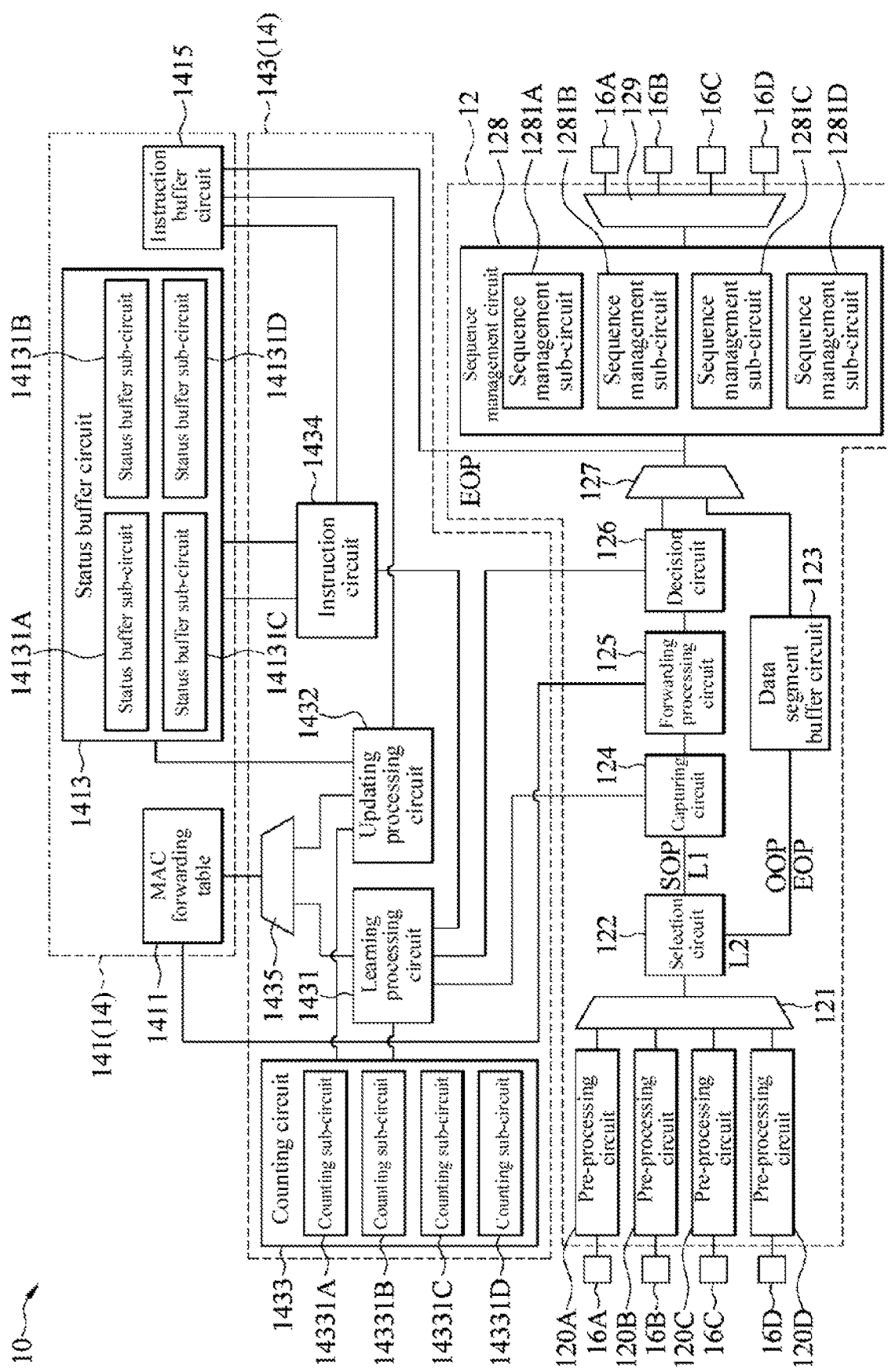
FIG. 2 is a schematic block diagram of a network switching device according to some embodiments of the present disclosure.

Referring to FIG. 2, FIG. 2 is a schematic block diagram of a network switching device 10 according to some embodiments of the present disclosure. In some embodiments, the forwarding engine 12 includes a plurality of pre-processing circuits 120A-120D, a first multiplexer 121, a selection circuit 122, a data segment buffer circuit 123, a capturing circuit 124, a forwarding processing circuit 125, a decision circuit 126, a second multiplexer 127, a sequence management circuit 128, and a demultiplexer 129. For the coupling relationship between the above elements, reference is made to FIG. 2.

The pre-processing circuits 120A-120D are configured to receive packets from the input/output ports 16A-16D, and perform preprocessing actions on the packets. Then, the pre-processing circuits 120A-120D output the processed packets to the selection circuit 122 via the first multiplexer 121. The preprocessing actions may include a segmentation action, a verification action, and a port identifier assignment action.

The verification action is verifying correctness of the packet to generate a packet verification parameter. For example, the correctness of the packet is verified through cyclic redundancy check (CRC) to generate the packet verification parameter.

The segmentation action is to segment a packet into a plurality of data segments. For example, as shown in FIG. 1 and FIG. 2, when the first pre-processing circuit 120A receives a 9-kilobyte (KB) packet from the first electronic device 20A via the first input/output port 16A, the first pre-processing circuit 120A performs a packet segmentation action on the packet to segment a plurality of fixed-size serial data segments (for example, each of the data segments is 128 bytes). In some embodiments, the data segment at the head of the packet may include a packet header, and the data segment at the tail of the packet may include a packet verification parameter. In some embodiments, a single packet may include a packet start segment SOP, at least one intermediate data segment OOP, and a packet end segment EOP. Specifically, the packet start segment SOP is a non-data segment at the head of the packet, for example, the packet header. The packet end segment EOP is a non-data segment at the tail of the packet, for example, the packet verification parameter. The intermediate data segment OOP is a plurality of fixed-size serial data segments into which the data in the packet is segmented.

During the port identifier assignment action, the pre-processing circuits 120A-120D generate corresponding port identifiers depending on which one of the input/output ports 16A-16D by which the received packet is input. The port identifier may be placed in each data segment and non-data segment segmented from the packet. In an alternately way, a port identifier is output accordingly when the data segment and the non-data segment are respectively output to the selection circuit 122. In other words, each data segment or non-data segment of the same packet (for example, the packet start segment SOP, the intermediate data segment OOP, and the packet end segment EOP) corresponds to the same port identifier.

As shown in FIG. 2, the selection circuit 122 is configured to output the packet start segment SOP to the capturing circuit 124 via a signal path L1, and output the intermediate data segment OOP and the packet end segment EOP to the data segment buffer circuit 123 via a signal path L2. The selection circuit 122 may be implemented by a multiplexer (MUX).

As shown in FIG. 2, the data segment buffer circuit 123 is configured to store the intermediate data segment OOP and the packet end segment EOP, and output the intermediate data segment OOP and the packet end segment EOP to the sequence management circuit 128 via the second multiplexer 127. The data segment buffer circuit 123 may be implemented by a first-in first-out (FIFO) buffer.

As shown in FIG. 2, the capturing circuit 124 is configured to parse the received packet start segment SOP to obtain and output the port identifier and the source MAC address of the packet header to the two-stage learning engine 14 for performing the MAC address learning method. The capturing circuit 124 obtains the destination MAC address of the packet header from the packet start segment SOP for the forwarding processing circuit 125 to perform forwarding query. In some embodiments, the packet start segment SOP may further include virtual local area network (VLAN) information, and the capturing circuit 124 may obtain the virtual local area network information, the source MAC address, and the port identifier from the packet start segment SOP for the two-stage learning engine 14 to perform the MAC address learning method.

As shown in FIG. 2, the forwarding processing circuit 125 is configured to compare the MAC forwarding table 1411 according to the destination MAC address to perform forwarding query and generate a forwarding instruction. The sequence management circuit 128 is configured to start forwarding the packet via the demultiplexer 129 after receiving the forwarding instruction. For example, the sequence management circuit 128 combines the packet start segment SOP, the intermediate data segment OOP, and the packet end segment EOP corresponding to the same port identifier to restore the packet, and forwards the packet after receiving the forwarding instruction. In some embodiments, the sequence management circuit 128 includes a plurality of sequence management sub-circuits 1281A-1281D respectively corresponding to the input/output ports 16A-16D, and stores the packets from the corresponding input/output ports 16A-16D before receiving the forwarding instruction.

As shown in FIG. 2, the decision circuit 126 is configured to perform other functions in addition to packet forwarding and MAC address learning of the network switching device 10, for example, transmission flow monitoring. The capturing circuit 124, the forwarding processing circuit 125, and the decision circuit 126 may be implemented by an operational circuit such as a central processing unit, a microprocessor, or the like. The sequence management circuit 128 may be implemented by a controller having a storage medium.

Figure 3:
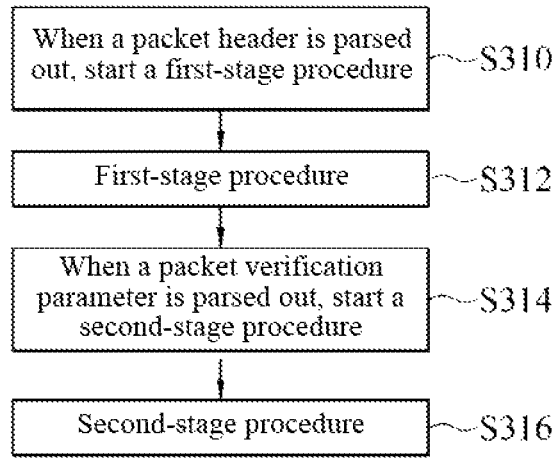
FIG. 3 is a schematic flowchart of a MAC address learning method according to some embodiments of the present disclosure.

Referring to FIG. 3, FIG. 3 is a schematic flowchart of a MAC address learning method according to some embodiments of the present disclosure. In some embodiments, the MAC address learning method of the present disclosure (that is, a method for establishing and maintaining a MAC forwarding table 1411) is adapted to be performed by a network switching device 10. First, when a packet header is parsed out, a two-stage learning circuit 143 starts a first-stage procedure (step S310). Specifically, the two-stage learning circuit 143 starts the first-stage procedure when obtaining the source MAC address and the port identifier from the forwarding engine 12. Then, the first-stage procedure is performed (step S312). In some embodiments of step S310, the two-stage learning circuit 143 starts the first-stage procedure when obtaining VLAN information, the source MAC address and the port identifier.

Figure 4:
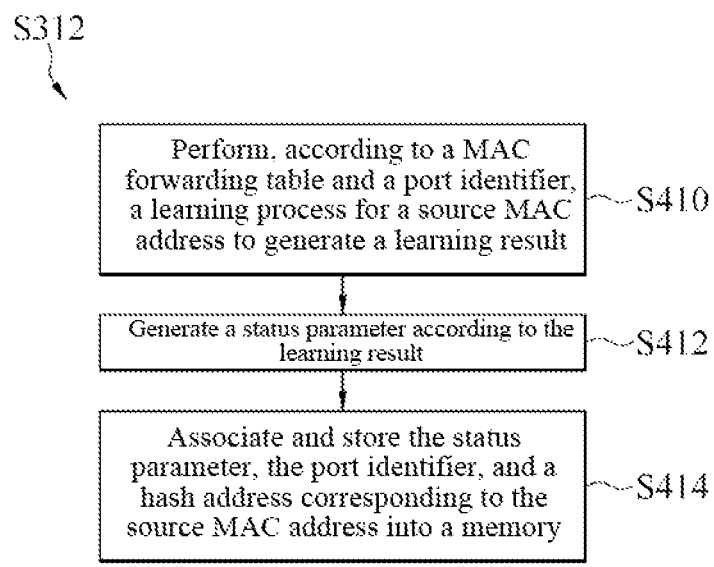
FIG. 4 is a schematic flowchart of a first-stage procedure according to some embodiments of the present disclosure.

Referring to FIG. 4, FIG. 4 is a schematic flowchart of a first-stage procedure according to some embodiments of the present disclosure. First, the two-stage learning circuit 143 performs, according to a MAC forwarding table 1411 and a port identifier, a learning process for the source MAC address to generate a learning result (step S410). Next, the two-stage learning circuit 143 generates a status parameter according to the learning result (step S412). Then, the two-stage learning circuit 143 associates and stores the status parameter, the port identifier, and a hash address (detailed later) corresponding to the source MAC address into a memory 141 (step S414).

In some embodiments, as shown in FIG. 2, the two-stage learning circuit 143 includes a learning processing circuit 1431. The learning processing circuit 1431 is coupled to a capturing circuit 124 and the MAC forwarding table 1411 to perform the first-stage procedure. In some embodiments, the memory 141 includes a status buffer circuit 1413. The status buffer circuit 1413 is configured to store the associated status parameter, port identifier, and hash address corresponding to the source MAC address. The status buffer circuit 1413 may be implemented by a first-in first-out buffer. In some embodiments, the status buffer circuit 1413 includes a plurality of status buffer sub-circuits 14131A-14131D respectively corresponding to the input/output ports 16A-16D. In some embodiments of step S414, the two-stage learning circuit 143 stores the associated status parameter, port identifier, and hash address into the corresponding status buffer sub-circuits 14131A-14131D according to the port identifier. In some embodiments, the status buffer sub-circuits 14131A-14131D are serially connected together in the status buffer circuit 1413 according to an order of the input/output ports 16A-16D.

In some embodiments, as shown in FIG. 2, the two-stage learning circuit 143 further includes an instruction circuit 1434. The instruction circuit 1434 is coupled to the learning processing circuit 1431 and the status buffer circuit 1413. In some embodiments of step S414, the learning processing circuit 1431 sends a push instruction to the status buffer circuit 1413 through the instruction circuit 1434, so that the status buffer circuit 1413 stores, in response to the push instruction, the associated status parameter, port identifier, and hash address corresponding to the source MAC address.

Referring to FIG. 3 again, in another aspect, when a packet verification parameter is parsed out, the two-stage learning circuit 143 starts a second-stage procedure (step S314). Specifically, the two-stage learning circuit 143 starts the second-stage procedure when obtaining the packet verification parameter and the port identifier from the forwarding engine 12. Then, the second-stage procedure (step S316) is performed to confirm whether the packet verification passed or not (that is, to confirm whether packet data is correct or not). If the verification passed (that is, the packet is correct), the two-stage learning circuit 143 reads the data stored in the memory 141 during the first-stage procedure, and updates the MAC forwarding table 1411 according to the obtained data.

Figures 5, 6:
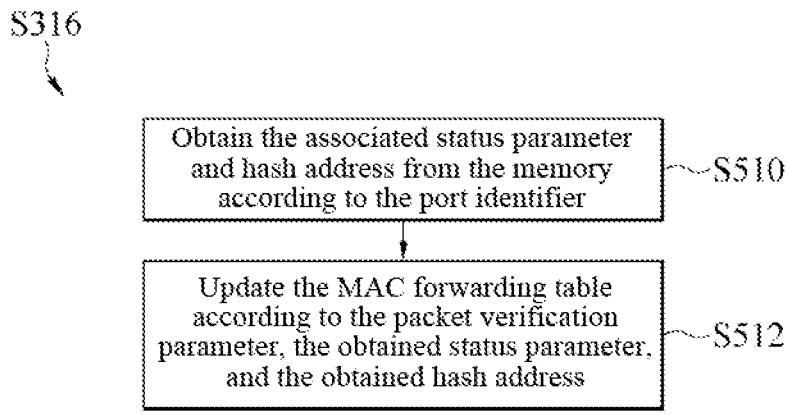
FIG. 5 is a schematic flowchart of a second-stage procedure according to some embodiments of the present disclosure.
FIG. 6 is a schematic diagram of a MAC forwarding table according to some embodiments of the present disclosure.

Referring to FIG. 5, FIG. 5 is a schematic flowchart of a second-stage procedure according to some embodiments of the present disclosure. If the verification passed, the two-stage learning circuit 143 obtains the associated status parameter and hash address from the memory 141 according to the port identifier (step S510). Then, the two-stage learning circuit 143 updates the MAC forwarding table 1411 according to the packet verification parameter, the obtained status parameter, and the obtained hash address (step S512).

If the verification failed (that is, the packet is incorrect), the two-stage learning circuit 143 does not update the MAC forwarding table 1411. In some embodiments, if the verification failed, the two-stage learning circuit 143 may restore the action or modification performed on the MAC forwarding table 1411 during the first-stage procedure, that is, restores the MAC forwarding table 1411 when the first-stage procedure has not been executed, and does not update the MAC forwarding table 1411 either. In some embodiments, as shown in FIG. 2, the two-stage learning circuit 143 further includes an updating processing circuit 1432 coupled to the status buffer circuit 1413, the MAC forwarding table 1411, and the forwarding engine 12 (not shown) to execute the second-stage procedure.

In this way, an erroneous MAC address may be prevented from being stored in the MAC forwarding table 1411, so as to ensure an effective storage space of the MAC forwarding table 1411. In some embodiments, since an amount of required data stored in the memory 141 for performing the MAC address learning method is relatively small relative to the entire packet, the MAC address learning method of the present invention may further reduce the storage space required by the memory 141 or other storage media in the network switching device 10.

In some embodiments, as shown in FIG. 2, the memory 141 further includes an instruction buffer circuit 1415. The instruction buffer circuit 1415 is coupled to the updating processing circuit 1432, the second multiplexer 127, and the instruction circuit 1434. The instruction buffer circuit 1415 may be implemented by a first-in first-out buffer. In some embodiments of step S510, the updating processing circuit 1432 obtains the packet verification parameter and the port identifier of the packet end segment EOP through the instruction buffer circuit 1415. The updating processing circuit 1432 transmits a control signal to the instruction buffer circuit 1415 according to the port identifier. The instruction buffer circuit 1415 transmits a pop instruction to the status buffer circuit 1413 through the instruction circuit 1434 in response to the control signal. The status buffer circuit 1413 outputs the status parameter and the hash address associated with the port identifier to the updating processing circuit 1432 in response to the pop instruction.

In some embodiments, priority of the status buffer circuit 1413 in response to the pop instruction is lower than priority of responding to the push instruction. Therefore, when the status buffer circuit 1413 simultaneously receives the pop instruction and the push instruction, the instruction buffer circuit 1415 may temporarily store the port identifier, the packet verification parameter, and the control signal, so that data loss is not caused due to the lower priority.

In some embodiments, as shown in FIG. 2, the two-stage learning circuit 143 further includes an arbiter 1435. The arbiter 1435 is coupled between the MAC forwarding table 1411, the learning processing circuit 1431, and the updating processing circuit 1432. During starting of the first-stage procedure, the arbiter 1435 turns on the coupling between the MAC forwarding table 1411 and the learning processing circuit 1431, so that the learning processing circuit 1431 can execute the first-stage procedure. During starting of the second-stage procedure, the arbiter 1435 turns on the coupling between the MAC forwarding table 1411 and the learning processing circuit 1432, so that the learning processing circuit 1432 can execute the second-stage procedure.

Referring to FIG. 6, Table 1, and Table 2. FIG. 6 is a schematic diagram of a MAC forwarding table 1411 according to some embodiments of the present disclosure. Table 1 is the description of all fields in FIG. 6. Table 2 is a hash table. Each row in FIG. 6 is an entry. Each entry corresponds to a hash address. Each entry may include a MAC address, a status flag, an elapsed time parameter, a port identifier parameter, and a MAC quantity corresponding to the port identifier parameter that are recorded. The status flag includes an update flag, an establish flag, and a move flag. Here, the port identifier parameters "port A", "port B", "port C", and "port D" shown in FIG. 6 respectively correspond to a first input/output port 16A to a fourth input/output port 16D.

In some embodiments, in order to conveniently and quickly read the recorded MAC address of the MAC forwarding table 1411 from the memory 141, the memory 141 may store a hash table. There is a mapping relationship between the hash table (shown in Table 2) and the MAC forwarding table 1411 (shown in FIG. 6), so that the MAC forwarding table 1411 can be quickly read and searched through the hash table. In the hash table, a single hash value corresponds to a set of hash addresses. For example, as shown in Table 2, a single hash value (such as "0x00") corresponds to a set of hash addresses composed of four hash addresses ("0x00/0x0", "0x00/0x1", "0x00/0x2", "0x00/0x3"). The hash address may be a physical address in the memory 141. For example, "0x00/0x0" is a physical address "0x00", "0x00/0x1" is a physical address "0x01", and the like. The hash value may be generated by the learning processing circuit 1431 using the source MAC address and the VLAN information to calculate a result of a hash function.

In some embodiments, each of the input/output ports 16A-16D corresponds to a MAC quantity, and the MAC forwarding table 1411 may store the MAC quantities. In some embodiments, the port identifier parameter, the port identifier, and the MAC quantity corresponding to the same one of the input/output ports 16A-16D are correlated with each other. The MAC quantity is the total quantity of the MAC addresses corresponding to a single input/output port 16A-16D in the MAC forwarding table 1411. For example, as shown in FIG. 6, the port identifier parameter corresponding to the first input/output port 16A is "port A". In the MAC forwarding table 1411, it is shown that the first input/output port 16A corresponds to two recorded MAC addresses.

In some embodiments, as shown in FIG. 2, the two-stage learning circuit 143 further includes a counting circuit 1433. The counting circuit 1433 is coupled to the MAC forwarding table 1411. The counting circuit 1433 is configured to accumulate the MAC quantity of each of the input/output ports 16A-16D. The counting circuit 1433 may include a plurality of counting sub-circuits 14331A-14331D to respectively accumulate the MAC quantities of the input/output ports 16A-16D. In some embodiments, the counting circuit 1433 may further be coupled to the learning processing circuit 1431 and the updating processing circuit 1432. The learning processing circuit 1431 or the updating processing circuit 1432 may drive the counting circuit 1433 to

TABLE 1 is the description of all fields in FIG. 6, specifically shown as follows.

| Name | Function description | Data length (bit) |
| --- | --- | --- |
| Hash address | Storage location of each entry in the MAC forwarding table in the memory | Depending on design requirements |
| MAC address | Recorded source MAC address (that is, a recorded MAC address) | Depending on design requirements |
| Port identifier parameter | Port identifier corresponding to the recorded source MAC address (that is, a corresponding input/output port) | Depending on design requirements |
| MAC quantity | Total quantity of MAC addresses corresponding to the input/output ports in the MAC forwarding table | Depending on design requirements |
| Elapsed time parameter | Time at which an entry is not updated or time at which an entry is to be removed | Depending on design requirements |
| Update flag | Whether to pass the update test, for example, logic "1" indicates "pass" , and logic "0" indicates "fail" | 1 |
| Move flag | Whether to pass station move test or station move MAC limit exceed test, for example, logic "1" indicates "pass" , and logic "0" indicates "fail" | 1 |
| Establish flag | Whether it is a newly created entry and has not been validated by the second-stage procedure, for example, logic "1" indicates a newly created and unvalidated entry, and logic "0" indicates not a newly created and validated entry | 1 |
| Static | Whether the MAC forwarding table is input and managed by a user, for example, logic "1" indicates input and managed by the user itself, and logic "0" indicates input and managed not by the user itself | 1 |
| Valid | Whether the entry is valid, for example, logic "1" indicates that the entry is valid, and logic "0" indicates that the entry is invalid | 1 |

TABLE 2

(a hash table)

| Hash value | First hash address | Second hash address | Third hash address | Fourth hash address |
| --- | --- | --- | --- | --- |
| 0x00 | 0x00/0x0 | 0x00/0x1 | 0x00/0x2 | 0x00/0x3 |
| 0x04 | 0x04/0x0 | 0x04/0x1 | 0x04/0x2 | 0x04/0x3 |
| 0x08 | 0x08/0x0 | 0x08/0x1 | 0x08/0x2 | 0x08/0x3 | accumulatively increase the MAC quantity (for example, add the MAC quantity by one) or accumulatively decrease the MAC quantity (for example, subtract one from the MAC quantity) when the MAC quantity of one of the input/output ports 16A-16D needs to be increased or decreased.

In some embodiments, the learning process may include a MAC limit exceed test, a hash collision test, an updating test, a station move test, and a station move MAC limit exceed test (described later).

In some embodiments, the learning processing circuit 1431 compares the entry recorded in the MAC forwarding table 1411 with the source MAC address. If the source MAC address does not have a corresponding entry in the MAC forwarding table 1411 (for example, all of the recorded MAC address of the entry in the MAC forwarding table 1411 are different from the source MAC address), the learning processing circuit 1431 executes the MAC limit exceed test and the hash collision test. If the test passed, the learning processing circuit 1431 establishes a new entry in the MAC forwarding table 1411, to record the source MAC address as a new recorded MAC address and record the port identifier as the port identifier parameter.

If the source MAC address has a corresponding entry in the MAC forwarding table 1411 (for example, the recorded MAC address of one of the entries in the MAC forwarding table 1411 is the same as the source MAC address), the learning processing circuit 1431 generates a learning result of "learning allowed", and performs an updating test, a port migration test, or a port migration limit exceed test.

In some embodiments, during the MAC limit exceed test, the learning processing circuit 1431 determines, according to the port identifier, whether the MAC quantity corresponding to the port identifier has reached an upper limit of the MAC quantity. If the upper limit of the MAC quantity has been reached, the learning processing circuit 1431 generates a learning result of "learning not allowed", that is, the test failed. If the upper limit of the MAC quantity has not been reached, the learning processing circuit 1431 generates a learning result of "learning allowed", that is, the test passed.

In some embodiments, during the hash collision test, the learning processing circuit 1431 determines, according to the MAC forwarding table 1411 and the hash table, whether all of the hash addresses in a set of hash addresses of hash values generated according to the source MAC address have been assigned MAC addresses or not. If all of the hash addresses have been assigned MAC addresses, the learning processing circuit 1431 generates a learning result of "learning not allowed", that is, the test failed. For example, as shown in FIG. 6 and Table 2, if the hash value generated according to the source MAC address is "0x04", and a first hash address to a fourth hash address of the hash value "0x04" have been assigned MAC addresses, the learning processing circuit 1431 generates a learning result of "learning not allowed". If not all of the hash addresses have been assigned MAC addresses, the learning processing circuit 1411 generates a learning result of "learning allowed", that is, the test passed, the learning processing circuit 1431 assigns the source MAC address to the hash address of the hash values that has no MAC address. For example, as shown in FIG. 6 and Table 2, if the hash value generated according to the source MAC address is "0x00", and no MAC address is assigned to the fourth hash address "0x00/0x3" of the hash value "0x00", the learning processing circuit 1431 generates a learning result of "learning allowed" and records the source MAC address in the storage location indicated by the fourth hash address "0x00/0x3". In some embodiments, hash addresses of the same hash value are sequentially assigned to the MAC addresses. For example, the order of assignment is "the first hash address, the second hash address, the third hash address, the fourth hash address", but the present disclosure is not limited thereto, and the assignment may alternatively be performed in other orders.

Figures 7, 8:
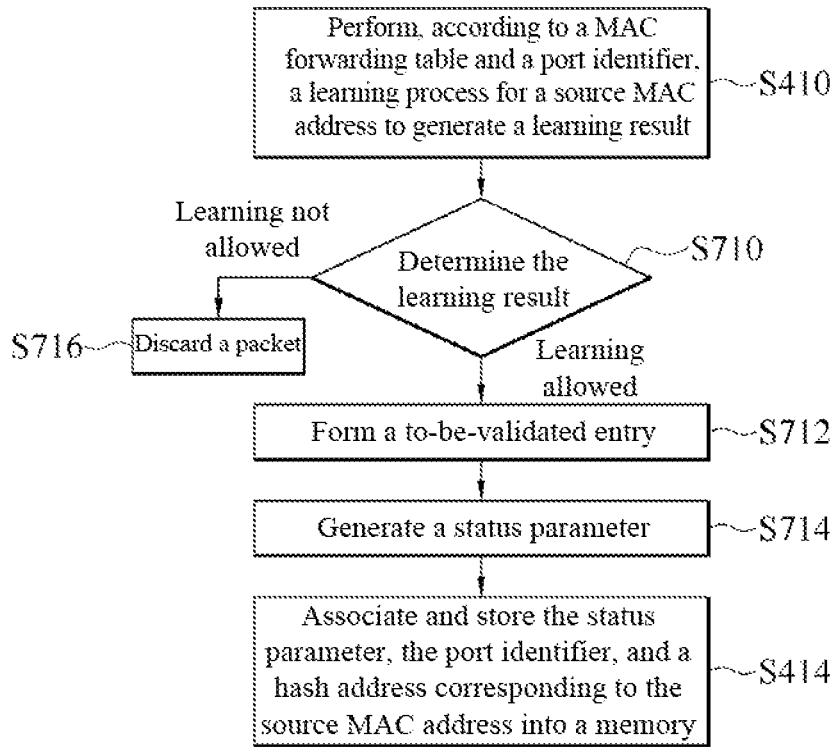
FIG. 7 is a schematic flowchart of a first-stage procedure according to some embodiments of the present disclosure.
FIG. 8 is a schematic diagram of the MAC forwarding table of the first-stage procedure that has not been executed according to some embodiments of the present disclosure.

Referring to FIG. 7, FIG. 7 is a schematic flowchart of a first-stage procedure according to some embodiments of the present disclosure. In some embodiments, the learning processing circuit 1431 is further coupled to the sequence management circuit 128 (not shown). In some embodiments, after a learning result is generated, the learning processing circuit 1431 determines the learning result (step S710). If it is determined that the learning result is "learning allowed", the learning processing circuit 1431 performs steps S712, S714, and step S414. If it is determined that the learning result is "learning not allowed", the learning processing circuit 1431 generates a discard identifier corresponding to the packet, and the sequence management circuit 128 discards the packet according to the discard identifier (step S716). Specifically, the sequence management circuit 128 discards the packet when detecting the discard identifier. In this way, the storage space of the sequence management circuit 128 is saved, and the speed of processing the packet is increased (for example, it may be determined whether to discard the packet during the first-stage procedure instead of starting determining whether to discard the packet after the data segments of the entire packet all have been processed). However, the present disclosure is not limited thereto. The sequence management circuit 128 may also discard the packet after the second-stage procedure. In some embodiments, as shown in FIG. 2, the decision circuit 126 is further coupled to the learning processing circuit 1431 to assist the learning processing circuit in generating the discard identifier.

In step S712, the learning processing circuit 1431 sets a status flag for an entry of the hash address corresponding to the source MAC address (this entry referred to as a to-be-updated entry below) in the MAC forwarding table 1411 according to the source MAC address, so as to form a to-be-validated entry for the second-stage procedure to perform validation before updating. For example, a to-be-validated entry is formed at the entry such as the update flag, the move flag, and/or the establish flag whose logic is set to "1". As shown in FIG. 6, the entries numbered "5" to "8" are the to-be-validated entries. Conversely, if the update flag, the move flag, and/or the establish flag are/is not set for the entry (for example, the update flag, the move flag, and the establish flag of the entry are all logic "0"), the entry is referred to as the to-be-updated entry. As shown in FIG. 6, the entries numbered "1" to "4" are the to-be-updated entries.

In step S714, the learning processing circuit 1431 generates corresponding status parameters according to the status flag. For example, the learning processing circuit 1431 generates a status parameter with the same digital logic as the status flag, for example, generates a status parameter with logic "1". The status parameter includes an updating parameter, a movement parameter, a movement limit exceed parameter, and an establishment parameter. The updating parameter corresponds to an update flag to indicate that the updating test is triggered and the test passed. The movement parameter and the movement limit exceed parameter correspond to the move flag to respectively indicate that the station move test and the station move limit exceed test are triggered and the tests passed. The establishment parameter corresponds to the establish flag to indicate that the learning processing circuit 1431 has established a new entry in the MAC forwarding table 1411.

Referring to FIG. 8, FIG. 8 is a schematic diagram of the MAC forwarding table 1411 of the first-stage procedure that has not been executed according to some embodiments of the present disclosure. In some embodiments of step S712, when a condition (herein referred to as a first condition) that the source MAC address does not have a corresponding to-be-updated entry in the MAC forwarding table 1411 (that is, the recorded MAC address that does not have an entry in the MAC forwarding table 1411 is the same as the source MAC address) is met, the learning processing circuit 1431 sets the establish flag for the to-be-updated entry to form the to-be-validated entry. Next, the learning processing circuit 1431 generates an establishment parameter in response to the establish flag (step S714). An example that meets the first condition may be an assumption that the source MAC address is "22-11-33-44-55-66", and then it can be seen from FIG. 8 that the MAC forwarding table 1411 does not have an entry related to the MAC address "22-11-33-44-55-66".

Referring to FIG. 9, FIG. 9 is a schematic diagram of the MAC forwarding table 1411 after the first-stage procedure is executed when a first condition is met according to some embodiments of the present disclosure. Specifically, if the learning result is learning allowed and the first condition met, the learning processing circuit 1431 establishes a new to-be-updated entry in the MAC forwarding table 1411 according to the source MAC address and the port identifier. For example, following the previous example, as shown in FIG. 9, the source MAC address and the port identifier are respectively used as the recorded MAC address and the port identifier parameter of the entry of the hash address "0x04/0x0" to form a new to-be-updated entry. Then, the learning processing circuit 1431 performs step S712 to form a to-be-validated entry. For example, as shown in FIG. 9, the establish flag of the to-be-updated entry (that is, the entry of the hash address "0x04/0x0") is changed from logic "0" to logic "1".

In some embodiments, when the establish flag is set for an entry of the MAC forwarding table 1411, the entry cannot be forwarded and queried. Specifically, the forwarding processing circuit 125 determines, during the forwarding and query, whether the establish flag is set for the entry of the MAC forwarding table 1411 (for example, whether the establish flag is logic "1"). If the establish flag is set, it indicates that the entry is newly established (for example, the to-be-validated entry formed by the newly established to-be-updated entry) and has not been subjected to packet verification and validation of the updating processing circuit 1432 during the second-stage procedure. Therefore, the forwarding processing circuit 125 does not need to compare a destination MAC address with the recorded MAC address of the entry. Otherwise, the forwarding processing circuit 125 will still compare the entry with the destination MAC address.

Referring to FIG. 8, in some embodiments of step S712, when a condition (herein referred to as a second condition) that the source MAC address has a corresponding to-be-updated entry in the MAC forwarding table 1411 and the port identifier parameter of the to-be-updated entry is consistent with the port identifier is met (that is, the source MAC address and the port identifier have been recorded by the MAC forwarding table 1411 and are the same as the recorded to-be-updated entry), the learning processing circuit 1431 sets the update flag for the to-be-updated entry to form the to-be-validated entry. Next, the learning processing circuit 1431 generates an updating parameter in response to the update flag (step S714). An example that meets the second condition may be an assumption that the source MAC address is "AA-BB-CC-DD-EE-FF" and the port identifier is "port A". It can be seen from FIG. 8 that the source MAC address and the port identifier are the same as the MAC address and the port identifier parameter of the entry (that is, the to-be-updated entry) of the hash address "0x00/0x0".

Referring to FIG. 10, FIG. 10 is a schematic diagram of the MAC forwarding table 1411 after the first-stage procedure is executed when a second condition is met according to some embodiments of the present disclosure. Specifically, if the second condition is met, the updating test is triggered and passed. For example, the input/output ports 16A-16D are still coupled to the electronic devices 20A-20D, and the electronic devices 20A-20D have not been replaced. Following the foregoing example, an example of step S712 that meets the second condition may be shown in FIG. 10, which is to convert the update flag of the entry (that is, the to-be-updated entry) of the hash address "0x00/0x0" from logic "0" to logic "1" (that is, a to-be-validated entry is formed accordingly).

Referring to FIG. 8, in some embodiments of step S712, when a condition (herein referred to as a third condition) that the source MAC address has a corresponding to-be-updated entry in the MAC forwarding table 1411 and the port identifier parameter of the to-be-updated entry is inconsistent with the port identifier is met (that is, the source MAC address has been recorded by the MAC forwarding table 1411 and the corresponding input/output port is changed), the learning processing circuit 1431 sets the move flag for the to-be-updated entry to form the to-be-validated entry. Next, the learning processing circuit 1431 generates a movement parameter or a movement limit exceed parameter in response to the move flag (step S714). An example that meets the third condition may be an assumption that the source MAC address is "AA-BB-CC-DD-EE-FF" and the port identifier is "port B". It can be seen from FIG. 8 that the source MAC address is the same as the MAC address of the entry (that is, the to-be-updated entry) of the hash address "0x00/0x0", but the port identifier is different from the port identifier parameter of the entry.

Referring to FIG. 11 and FIG. 12, FIG. 11 is a schematic diagram of the MAC forwarding table 1411 after the first-stage procedure is executed when a third condition is met according to an embodiment of the present disclosure. FIG. 12 is a schematic diagram of the MAC forwarding table 1411 after the first-stage procedure is executed when the third condition is met according to another embodiment of the present disclosure. Specifically, if the third condition is met, the station move test or the station move limit exceed test is triggered and passed. For example, the input/output ports 16A-16D to which the electronic devices 20A-20D are coupled are replaced. Specifically, the first electronic device 20A is coupled to the second input/output port 16B instead of being coupled to the first input/output port 16A. Following the foregoing example, an example of step S712 that meets the third condition may be shown in FIG. 11 and FIG. 12, which is to convert the move flag of the entry (that is, the to-be-updated entry) of the hash address "0x00/0x0" from logic "0" to logic "1" (that is, a to-be-validated entry is formed accordingly).

In some embodiments of step S712, the learning processing circuit 1431 further accumulatively increases a MAC quantity corresponding to the port identifier. For example, if the to-be-validated entry is formed when the first condition is met, the learning processing circuit 1431 further increases the MAC quantity corresponding to the port identifier of the packet start segment SOP. For example, as shown in FIG. 8 and FIG. 9, assuming that the port identifier is "port A", the MAC quantity corresponding to "port A" is increased by one (that is, the MAC quantity of "port A" is increased from 2 to 3). In this way, the network switching device 10 may learn a total quantity of MAC addresses to which each of the input/output ports 16A-16D may correspond in real time, so as to ensure that the storage space (for example, the MAC forwarding table 1411) can still store a new MAC address.

In some embodiments, if the to-be-validated entry is formed when the third condition is met, and the MAC quantity corresponding to the port identifier does not reach the upper limit of the MAC quantity, the learning processing circuit 1431 generates a movement parameter in response to the move flag, and the learning processing circuit 1431 further accumulatively increase the MAC quantity corresponding to the port identifier of the packet start segment SOP. For example, as shown in FIG. 11, assuming that the port identifier is "port B", the MAC quantity corresponding to "port B" is increased by one (that is, the MAC quantity of "port B" is increased from 2 to 3).

In some other embodiments, if the to-be-validated entry is formed when the third condition is met, and the MAC quantity corresponding to the port identifier has reached the upper limit of the MAC quantity, the learning processing circuit 1431 generates a movement limit exceed parameter in response to the move flag, and the learning processing circuit 1431 does not accumulatively increase the MAC quantity corresponding to the port identifier of the packet start segment SOP. For example, different from FIG. 11, in FIG. 12, the MAC quantity corresponding to "port B" remains unchanged (that is, the MAC quantity of "port B" remains at 2).

Referring to FIG. 5 again, in some embodiments of step S512, during the second-stage procedure, when the packet verification parameter is denoted as verification passed (for example, the packet verification parameter is denoted as verification passed with logic "0"), the updating processing circuit 1432 obtains corresponding to-be-validated entry from the MAC forwarding table 1411 according to the obtained hash address (that is, the hash address which is obtained in step S510), and performs timing updating, MAC accumulative total updating, port identifier updating, flag updating, or a combination thereof for the obtained to-be-validated entry according to the status parameter obtained from the status buffer circuit 1413 (that is, the status which is obtained in step S510).

During the timing updating, the updating processing circuit 1432 sets an elapsed time parameter of the obtained to-be-validated entry to a preset value. In order to save the storage space of the MAC forwarding table 1411, an upper limit of an aging time (for example, 300 seconds) is design for the network switching device 10. The elapsed time parameter of each entry is configured to accumulate times for which the entry has not been updated. When the elapsed time parameter of the entry reaches the upper limit of the aging time and the entry has not been updated, the entry is removed from the MAC forwarding table 1411. Therefore, when the entry is updated, the updating processing circuit 1432 resets the elapsed time parameter to a preset value (for example, reset to 0 seconds) to re-accumulate the time that has not been updated. However, the present disclosure is not limited thereto. The elapsed time parameter of each entry may be configured to count down the time at which the entry is to be removed (for example, when the entry has not been updated, accumulative decreasing is performed based on the upper limit of the aging time). Therefore, when the entry is updated, the updating processing circuit 1432 may reset the elapsed time parameter to the upper limit of the aging time (for example, reset to 300 seconds).

During the MAC accumulative total updating, the updating processing circuit 1432 accumulatively decreases a MAC quantity corresponding to a port identifier parameter of the obtained to-be-validated entry. During the port identifier updating, the updating processing circuit 1432 uses the port identifier of the packet end segment EOP as a port identifier parameter of the obtained to-be-validated entry. During the flag updating, the updating processing circuit 1432 clears the status flag of the obtained to-be-validated entry, so that the updated entry can be used as a new to-be-updated entry for execution during the first-stage procedure and the second-stage procedure started by subsequent packets.

In some embodiments, during the second-stage procedure, when the packet verification parameter is denoted as verification failed (for example, the packet verification parameter is denoted as verification failed with logic "1"), the updating processing circuit 1432 performs a restoration action for the to-be-validated entry according to the obtained hash address and the obtained status parameter. The restoration action includes an action to clear the status flag of the to-be-validated entry, an action to accumulatively decrease the MAC quantity corresponding to the port identifier of the packet end segment EOP, an action to remove the to-be-validated entry from the MAC forwarding table 1411, or a combination thereof. In this way, the operations and changes performed on the MAC forwarding table 1411 during the first-stage procedure are restored, and the MAC forwarding table 1411 is not updated either.

Figure 13:
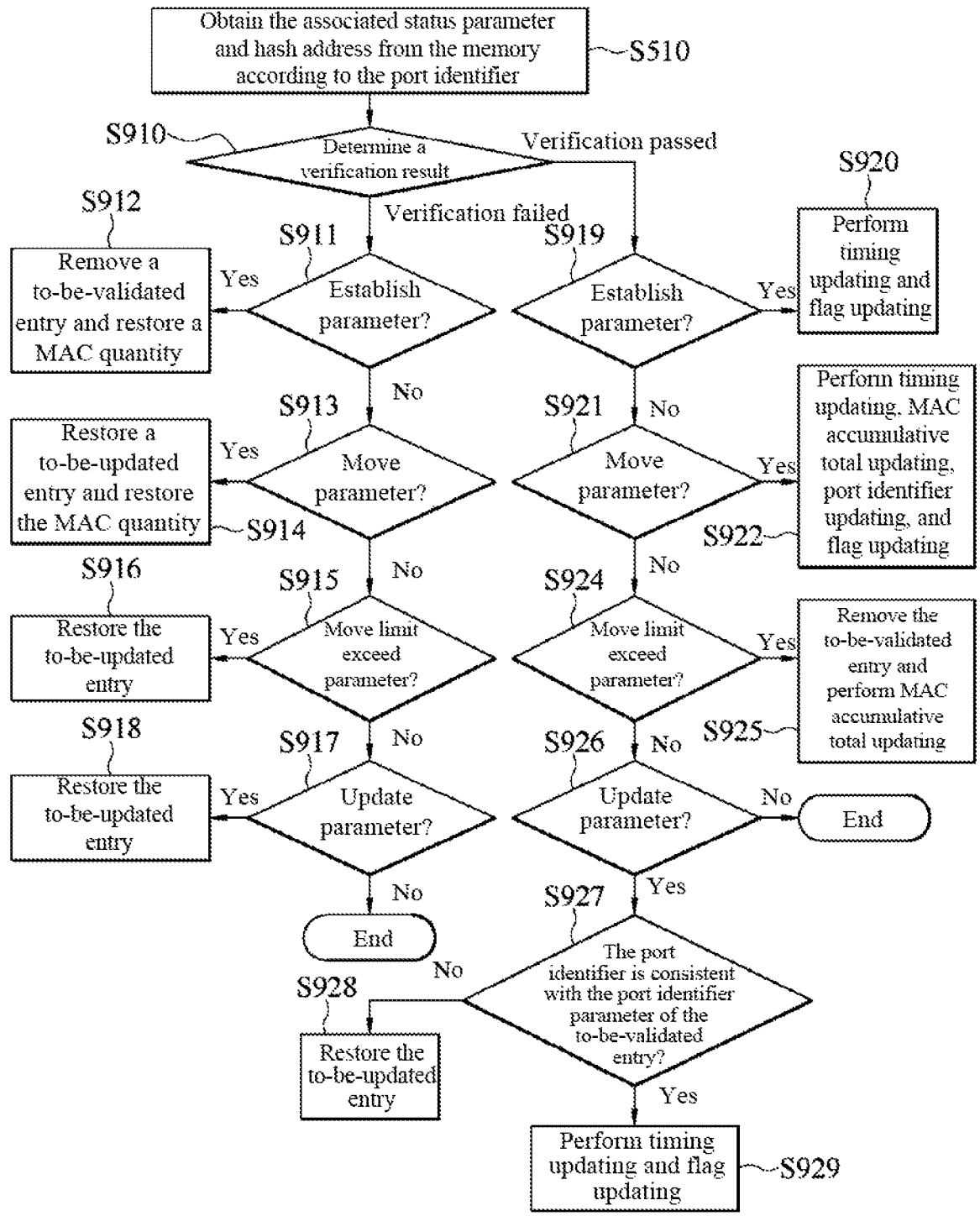
FIG. 13 is a schematic flowchart of a second-stage procedure according to some embodiments of the present disclosure.

Referring to FIG. 13, FIG. 13 is a schematic flowchart of a second-stage procedure according to some embodiments of the present disclosure. After a packet verification parameter is obtained, the updating processing circuit 1432 determines the packet verification parameter (step S910). If it is determined that a result is "verification failed", the updating processing circuit 1432 performs steps S911-S918 to perform a restoration action on the obtained to-be-validated entry to restore the MAC forwarding table 1411 before the first-stage procedure is executed (as shown in FIG. 8). If it is determined that the result is "verification passed", the updating processing circuit 1432 performs steps S919-S929 to perform an updating action on the obtained to-be-validated entry.

In step S911, the updating processing circuit 1432 determines whether the status parameter obtained from the status buffer circuit 1413 (that is, the status parameter obtained in step S510) is an establishment parameter. If the status parameter is the establishment parameter, it indicates that a new to-be-updated entry has been established according to the source MAC address of the packet. Since the verification failed, the updating processing circuit 1432 removes the obtained to-be-validated entry from the MAC forwarding table 1411 according to the establishment parameter and the obtained hash address (that is, the hash address obtained in step S510), and accumulatively decreases the MAC quantity corresponding to the port identifier of the packet end segment EOP (step S912). For example, the MAC forwarding table 1411 shown in FIG. 9 is restored to the MAC forwarding table 1411 shown in FIG. 8. Specifically, assuming that the hash address obtained in step S510 is "0x04/0x0" and the port identifier of the packet end segment EOP is "port A", information recorded in the entry (that is, the obtained to-be-validated entry) corresponding to the hash address "0x04/0x0" is deleted, and the MAC quantity corresponding to "port A" is decreased by one (for example, decreased from 3 to 2). If the status parameter is not the establishment parameter, step S913 is performed.

In step S913, the updating processing circuit 1432 determines whether the status parameter obtained from the status buffer circuit 1413 is a movement parameter. If the status parameter is the movement parameter, it indicates that the station move test is triggered and passed. Since the verification failed, the updating processing circuit 1432 clears a move flag of the obtained to-be-validated entry according to the movement parameter and the obtained hash address to restore the to-be-updated entry, and the updating processing circuit 1432 accumulatively decreases the MAC quantity corresponding to the port identifier of the packet end segment EOP (step S914). For example, the MAC forwarding table 1411 shown in FIG. 11 is restored to the MAC forwarding table 1411 shown in FIG. 8. Specifically, assuming that the hash address obtained in step S510 is "0x00/0x0" and the port identifier of the packet end segment EOP is "port B", the move flag of the entry (that is, the obtained to-be-validated entry) corresponding to the hash address "0x00/0x0" is changed from logic "1" to logic "0", and the MAC quantity corresponding to "port B" is decreased by one (for example, decreased from 3 to 2). If the status parameter is not the movement parameter, step S915 is performed.

In step S915, the updating processing circuit 1432 determines whether the status parameter obtained from the status buffer circuit 1413 is a movement limit exceed parameter. If the status parameter is the movement limit exceed parameter, it indicates that the station move limit exceed test is triggered and passed. Since the verification failed, the updating processing circuit 1432 clears the move flag of the obtained to-be-validated entry according to the movement limit exceed parameter and the obtained hash address to restore the to-be-updated entry (step S916). For example, the MAC forwarding table 1411 shown in FIG. 12 is restored to the MAC forwarding table 1411 shown in FIG. 8. Specifically, assuming that the hash address obtained in step S510 is "0x00/0x0", the move flag of the entry (that is, the obtained to-be-validated entry) corresponding to the hash address "0x00/0x0" is changed from logic "1" to logic "0". If the status parameter is not the movement limit exceed parameter, step S917 is performed.

In step S917, the updating processing circuit 1432 determines whether the status parameter obtained from the status buffer circuit 1413 is an updating parameter. If the status parameter is the updating parameter, it indicates that the updating test is triggered and passed. Since the verification failed, the updating processing circuit 1432 clears the update flag of the obtained to-be-validated entry according to the updating parameter and the obtained hash address to restore the to-be-updated entry (step S918). For example, the MAC forwarding table 1411 shown in FIG. 10 is restored to the MAC forwarding table 1411 shown in FIG. 8. Specifically, assuming that the hash address obtained in step S510 is "0x00/0x0", the update flag of the entry (that is, the obtained to-be-validated entry) corresponding to the hash address "0x00/0x0" is changed from logic "1" to logic "0". If the status parameter is not the updating parameter, the second-stage procedure is ended.

Referring to FIG. 13 and FIG. 14, FIG. 14 is a schematic diagram of the MAC forwarding table 1411 after the second-stage procedure is executed according to an establishment parameter when verification passed according to some embodiments of the present disclosure. In step S919, if the status parameter is the establishment parameter (it indicates that a new to-be-updated entry has been established according to the source MAC address of the packet), the updating processing circuit 1432 performs step S920. If the status parameter is not the establishment parameter, the updating processing circuit 1432 performs step S921. In step S920, since the verification passed, the updating processing circuit 1432 performs timing updating and flag updating on the obtained to-be-validated entry according to the establishment parameter. For example, the MAC forwarding table 1411 shown in FIG. 9 is updated to the MAC forwarding table 1411 shown in FIG. 14. Specifically, assuming that the hash address obtained in step S510 is "0x04/0x0", the establish flag of the entry (that is, the obtained to-be-validated entry) corresponding to the hash address "0x04/0x0" is changed from logic "1" to logic "0", and the elapsed time parameter is set to 0 seconds.

Referring to FIG. 13 and FIG. 15, FIG. 15 is a schematic diagram of the MAC forwarding table 1411 after the second-stage procedure is executed according to a movement parameter when the verification passed according to some embodiments of the present disclosure. In step S921, if the status parameter is the movement parameter (it indicates that the station move test is triggered and passed), the updating processing circuit 1432 performs step S922. If the status parameter is not the movement parameter, the updating processing circuit 1432 performs step S924. In step S922, since the verification passed, the updating processing circuit 1432 performs timing updating, MAC accumulative total updating, port identifier updating, and flag updating on the obtained to-be-validated entry according to the movement parameter. For example, the MAC forwarding table 1411 shown in FIG. 11 is updated to the MAC forwarding table 1411 shown in FIG. 15. Specifically, assuming that the hash address obtained in step S510 is "0x00/0x0" and the port identifier of the packet end segment EOP is "port B", the move flag of the entry (that is, the obtained to-be-validated entry) corresponding to the hash address "0x00/0x0" is changed from logic "1" to logic "0". The elapsed time parameter is set to 0 seconds, the MAC quantity corresponding to the port identifier parameter "port A" is decreased by one (for example, the MAC quantity is decreased from 2 to 1), and "port B" is used as the port identifier parameter.

Referring to FIG. 13 and FIG. 16, FIG. 16 is a schematic diagram of the MAC forwarding table 1411 after the second-stage procedure is executed according to a movement limit exceed parameter when the verification passed according to some embodiments of the present disclosure. In step S924, if the status parameter is the movement limit exceed parameter (it indicates that the station move limit exceed test is triggered and passed), the updating processing circuit 1432 performs step S925. If the status parameter is not the movement limit exceed parameter, the updating processing circuit 1432 performs step S926. In step S925, since the verification passed and the MAC quantity corresponding to the input/output ports 16A-16D after the electronic devices 20A-20D are replaced has reached the upper limit of the MAC quantity, the updating processing circuit 1432 removes the obtained to-be-validated entry from the MAC forwarding table 1411 according to the movement limit exceed parameter. Then, the updating processing circuit 1432 performs MAC accumulative total updating to ensure the correctness of the MAC forwarding table 1411. For example, the MAC forwarding table 1411 shown in FIG. 12 is updated to the MAC forwarding table 1411 shown in FIG. 16. Specifically, assuming that the hash address obtained in step S510 is "0x00/0x0", information recorded in the entry (that is, the obtained to-be-validated entry) corresponding to the hash address "0x00/0x0" is deleted, and the MAC quantity corresponding to the port identifier parameter "port A" is decreased by one (for example, the MAC quantity is decreased from 2 to 1).

Referring to FIG. 13 and FIG. 17, FIG. 17 is a schematic diagram of the MAC forwarding table 1411 after the second-stage procedure is executed according to an updating parameter when the verification passed according to some embodiments of the present disclosure. In step S926, if the status parameter is the updating parameter (it indicates that the updating test is triggered and passed), the updating processing circuit 1432 performs steps S927-S929. If the status parameter is not the updating parameter, the second-stage procedure is ended. In step S929, since the verification passed, the updating processing circuit 1432 performs timing updating and flag updating on the obtained to-be-validated entry according to the updating parameter. For example, the MAC forwarding table 1411 shown in FIG. 10 is updated to the MAC forwarding table 1411 shown in FIG. 17. Specifically, assuming that the hash address obtained in step S510 is "0x00/0x0", the update flag of the entry (that is, the obtained to-be-validated entry) corresponding to the hash address "0x00/0x0" is changed from logic "1" to logic "0", and the elapsed time parameter is set to 0 seconds.

In some embodiments, before step S929 is performed, the updating processing circuit 1432 further determines whether the port identifier of the packet end segment EOP is consistent with the port identifier parameter of the obtained to-be-validated entry (step S927). In some cases, the first packet and the second packet start the second-stage procedure after having started the first-stage procedure (generally, the second packet starts the first-stage procedure and the second-stage procedure after the first packet starts the first-stage procedure and the second-stage procedure). For example, in an example, as shown in FIG. 2, because there are other elements (such as the forwarding processing circuit 125 and the decision circuit 126) between the output terminals of the capturing circuit 124 and the second multiplexer 127 (such as the signal path L1), a possible delay on the signal path L1 may be caused. Therefore, for the two-stage learning circuit 143, the first-stage procedure may have been started by the second packet before the second-stage procedure is started by the first packet. In another example, the first packet has a relatively large amount of data, and the second packet has a relatively small amount of data, so that when the first packet and the second packet have both started the first-stage procedure, after the second packet starts the second-stage procedure, the first packet starts the second-stage procedure.

For example, assuming that the source MAC addresses of the first packet and the second packet are both "15-87-5D-6E-7A-D8", it can be seen from FIG. 6 that an update flag and a move flag are both set for the entry numbered "5". In other words, the first packet and the second packet have gone through the first-stage procedure, but the first packet and the second packet have not gone through the second-stage procedure. Assuming that the first packet and the second packet respectively trigger the station move test and the updating test, in this case, since the two-stage learning circuit 143 may have changed the entry numbered "5" from "port C" to other values before performing step S929, when step S929 is to be performed, the port identifier of the packet end segment EOP may be different from the port identifier parameter of the obtained to-be-validated entry.

Therefore, in order to prevent the above situation from causing an incorrect recording of the MAC forwarding table 1411, step S929 is performed when it is confirmed that the port identifier of the packet end segment EOP is consistent with the port identifier parameter of the obtained to-be-validated entry. When the port identifier of the packet end segment EOP is inconsistent with the port identifier parameter of the obtained to-be-validated entry, the updating processing circuit 1432 clears the update flag of the obtained to-be-validated entry according to the updating parameter and the obtained hash address (the hash address obtained in step S510) to restore the to-be-updated entry (step S928). In other words, the MAC forwarding table 1411 is not updated. For example, the MAC forwarding table 1411 in FIG. 10 is restored to the MAC forwarding table 1411 in FIG. 8. In this way, it is ensured that the MAC forwarding table 1411 stores the correct entries.

Based on the above, according to some embodiments, the network switching device filters out an erroneous source MAC address from the MAC address forwarding table in the case of cut-through switching, so that in the case of packet forwarding, the MAC address forwarding table can still store only correct source MAC addresses. The entire procedure of the network switching device of the present invention (that is, the network learns the source MAC address to the MAC address forwarding table) can be proceed without the cooperative processing of the processor. In other words, the network switching device can learn the source MAC address to the MAC address forwarding table at the line rate (due to not being limited by the processing speed of the processor). According to some embodiments, since the network switching device may perform a learning process for the source MAC address when receiving the source MAC address from the packet (in other words, there is no need to perform the learning process after storing the entire packet), a storage capacity required during processing of the packet by the network switching device is reduced, and a processing speed during processing of the packet by the network switching device is increased.

What is claimed is:

1. A network device, comprising:
   a forwarding engine configured to receive a packet from an input/output port, parse out a packet header and a packet verification parameter of the packet, and generate a port identifier corresponding to the input/output port, wherein the forwarding engine forwards the packet to another input/output port according to a Media Access Control (MAC) forwarding table, and the packet header has a source MAC address; and
   a two-stage learning engine comprising:
      a memory storing the MAC forwarding table; and
      a two-stage learning circuit configured to:
         start a first-stage procedure when the packet header is parsed out, wherein the first-stage procedure comprises:
            performing, according to the MAC forwarding table and the port identifier, a learning process for the source MAC address to generate a learning result;
            generating a status parameter according to the learning result; and
            associating and storing the status parameter, the port identifier, and a hash address corresponding to the source MAC address into the memory; and
         start a second-stage procedure when the packet verification parameter is parsed out, wherein the second-stage procedure comprises:
            obtaining the status parameter and the hash address from the memory according to the port identifier; and
            updating the MAC forwarding table according to the packet verification parameter, the obtained status parameter, and the obtained hash address.

2. The network device according to claim 1, wherein when the learning result is learning not allowed, the two-stage learning circuit generates a discard identifier corresponding to the packet, and the forwarding engine discards the packet according to the discard identifier.

3. The network device according to claim 1, wherein during the first-stage procedure, when the learning result is learning allowed, the two-stage learning circuit sets, according to the source MAC address and in the MAC forwarding table, a status flag for a to-be-updated entry of the hash address corresponding to the source MAC address to form a to-be-validated entry, and generates the corresponding status parameter according to the status flag.

4. The network device according to claim 3, wherein during the second-stage procedure, when the packet verification parameter is denoted as verification passed, the two-stage learning circuit obtains, according to the obtained hash address, the corresponding to-be-validated entry from the MAC forwarding table, and performs, according to the obtained status parameter, timing updating, MAC accumulative total updating, port identifier updating, flag updating, or a combination thereof for the obtained to-be-validated entry.

5. The network device according to claim 4, wherein during the timing updating, the two-stage learning circuit sets an elapsed time parameter of the obtained to-be-validated entry to a preset value.

6. The network device according to claim 4, wherein during the MAC accumulative total updating, the two-stage learning circuit accumulatively decreases a MAC quantity corresponding to a port identifier parameter of the obtained to-be-validated entry.

7. The network device according to claim 4, wherein during the port identifier updating, the two-stage learning circuit uses the port identifier as a port identifier parameter of the obtained to-be-validated entry.

8. The network device according to claim 4, wherein during the flag updating, the two-stage learning circuit clears the status flag of the obtained to-be-validated entry.

9. The network device according to claim 3, wherein during the first-stage procedure, when the learning result is learning allowed, the two-stage learning circuit accumulatively increases a MAC quantity corresponding to the port identifier.

10. The network device according to claim 9, wherein during the second-stage procedure, when the packet verification parameter is denoted as verification failed, the two-stage learning circuit performs a restoration action for the to-be-validated entry according to the obtained hash address and the obtained status parameter, wherein the restoration action comprises an action to clear the status flag of the to-be-validated entry, an action to accumulatively decrease the MAC quantity corresponding to the port identifier, an action to remove the to-be-validated entry from the MAC forwarding table, or a combination thereof.

11. A MAC address learning method is adapted to a network device, the method comprising:
receiving a packet from an input/output port;
generating a port identifier corresponding to the input/output port;
starting a first-stage procedure when a packet header of the packet is parsed out, wherein the packet header has a source MAC address;
starting a second-stage procedure when a packet verification parameter of the packet is parsed out; and
forwarding the packet to another input/output port according to a MAC forwarding table of a memory, wherein the first-stage procedure comprises:
performing, according to the MAC forwarding table and the port identifier, a learning process for the source MAC address to generate a learning result;
generating a status parameter according to the learning result; and
associating and storing the status parameter, the port identifier, and a hash address corresponding to the source MAC address into the memory, and wherein the second-stage procedure comprises:
obtaining the status parameter and the hash address from the memory according to the port identifier; and
updating the MAC forwarding table according to the packet verification parameter, the obtained status parameter, and the obtained hash address.

12. The MAC address learning method according to claim 11, wherein when the learning result is learning not allowed, generating a discard identifier corresponding to the packet, and discarding the packet according to the discard identifier.

13. The MAC address learning method according to claim 11, wherein during the first-stage procedure, when the learning result is learning allowed, setting, according to the source MAC address and in the MAC forwarding table, a status flag for a to-be-updated entry of the hash address corresponding to the source MAC address to form a to-be-validated entry, and generating the corresponding status parameter according to the status flag.

14. The MAC address learning method according to claim 13, wherein during the second-stage procedure, when the packet verification parameter is denoted as verification passed, obtaining the corresponding to-be-validated entry from the MAC forwarding table according to the obtained hash address, and performing timing updating, MAC accumulative total updating, port identifier updating, flag updating, or a combination thereof for the obtained to-be-validated entry according to the obtained status parameter.

15. The MAC address learning method according to claim 14, wherein during the timing updating, setting an elapsed time parameter of the obtained to-be-validated entry to a preset value.

16. The MAC address learning method according to claim 14, wherein during the MAC accumulative total updating, accumulatively decreasing a MAC quantity corresponding to a port identifier parameter of the obtained to-be-validated entry.

17. The MAC address learning method according to claim 14, wherein during the port identifier updating, using the port identifier as a port identifier parameter of the obtained to-be-validated entry.

18. The MAC address learning method according to claim 14, wherein during the flag updating, clearing the status flag of the obtained to-be-validated entry.

19. The MAC address learning method according to claim 13, wherein during the first-stage procedure, when the learning result is learning allowed, accumulatively increasing a MAC quantity corresponding to the port identifier.

20. The MAC address learning method according to claim 19, wherein during the second-stage procedure, when the packet verification parameter is denoted as verification failed, performing a restoration action for the to-be-validated entry according to the obtained hash address and the obtained status parameter, wherein the restoration action comprises an action to clear the status flag of the to-be-validated entry, an action to accumulatively decrease the MAC quantity corresponding to the port identifier, an action to remove the to-be-validated entry from the MAC forwarding table, or a combination thereof.

* * * * *